Aug. 8, 1944.   G. H. NELSON ET AL   2,355,232
DRY CELL APPARATUS
Filed July 25, 1941   3 Sheets-Sheet 1

Inventors:
George H. Nelson and
Allison M. MacFarland
By: Jesch and Darbo
Attys.

Aug. 8, 1944.  G. H. NELSON ET AL  2,355,232
DRY CELL APPARATUS
Filed July 25, 1941  3 Sheets-Sheet 2

Inventors:
George H. Nelson and
Allison M. MacFarland
By: Jesch and Darbo Attys

Patented Aug. 8, 1944

2,355,232

UNITED STATES PATENT OFFICE 2,355,232

DRY CELL APPARATUS

George H. Nelson and Allison M. MacFarland, Freeport, Ill., assignors to Burgess Battery Company, Chicago, Ill., a corporation of Delaware Application July 25, 1941, Serial No. 403,952

17 Claims. (Cl. 91—42)

This invention relates to apparatus for making dry cells, and particularly for applying a layer of starch or other separating material to the interior cylindrical surface of a metal dry cell anode. It is the object of the invention to provide an apparatus which forms a uniform layer and is adapted for high speed production.

Briefly, the invention provides apparatus which receives the cylindrical dry cell electrodes at a predetermined station and conveys them to a different station at which it injects a quantity of liquid suspension of the separating material into the electrodes, and then rotates or spins the electrodes at a high velocity to expel liquid from the suspension beyond the open edge or edges of the electrodes and to leave an immobile, substantially solid layer of the separating material in adherent relation to the interior cylindrical surface of the electrodes, the apparatus meanwhile conveying the coated electrodes to the original station, where the coated electrode is ejected and a new one inserted. Optionally, the apparatus may contain heating means for further drying and hardening the formed layer.

Figure 1:
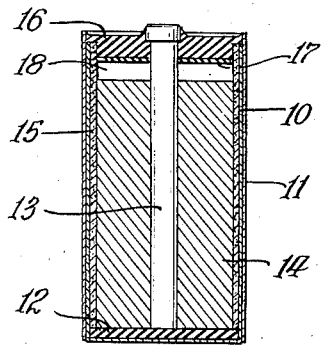
Fig. 1 is a sectional elevation of a dry cell in the making of which the apparatus of this invention may be used.

In the form of construction shown in Fig. 1, the dry cell consists of a cylindrical metal negative electrode or anode 10, which is enclosed in a cylindrical electrical insulating jacket 11 and upon the bottom of which is disposed a layer of electrical insulating material 12. The cell contains a central carbon rod positive electrode 13, a body of depolarizing material 14 surrounding the carbon rod 13, a gelatinous layer of electrolyte 15 separating the depolarizing body from the cylindrical metal electrode, and a fusible seal closure 16 for the open end of the cylindrical electrode, the seal 16 resting upon paper board washer 17 which is spaced above the top of the depolarizing body to form an expansion space 18.

In the usual construction of a dry cell, the electrolyte is initially in the form of a liquid suspension of starch particles and becomes gelatinous by gelatinization of the starch after it is in place between the metal electrode and the depolarizing body. It is essential that positive separation be provided between the depolarizing body and the metal electrode prior to such gelatinization, and in common practice this has been accomplished by enclosing the depolarizing body in a bibulous fabric wrapper, or providing a paper lining against the interior surface of the metal electrode. In a recent method, a separating medium in the form of a substantially solid layer of starch particles in adherent relation to the interior surface of the metal cylinder is provided by spinning the electrode about its axis while containing a liquid suspension of the starch. This latter dry cell construction and the method of forming it is described and claimed in the co-pending application of our co-worker Herbert E. Lawson, Serial No. 303,592, filed November 9, 1939, now Patent No. 2,307,627, issued January 5, 1943. In such method, after the starch layer has been formed, the depolarizing body, containing moisture and electrolyte salts, such as zinc chloride and ammonium chloride, is compressed into position against the layer of starch. The starch thereupon absorbs moisture and electrolyte salts from the depolarizing body and becomes the gelatinous electrolyte of the cell.

Figure 2:
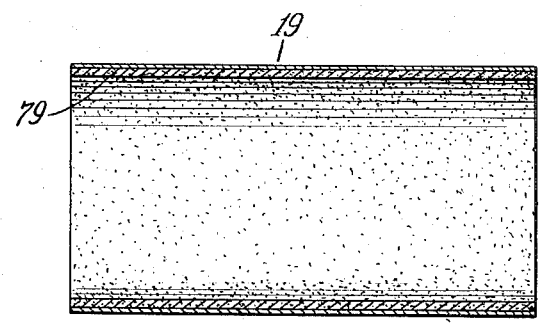
Fig. 2 is a sectional view of a cylindrical metal dry cell electrode which is open at both ends and to which an adherent layer of separating material has been applied by the apparatus of this invention.

The present invention is directed to providing an apparatus for applying the substantially solid layer of starch to the interior cylindrical surface of the metal electrode uniformly and rapidly for large scale plant production. A layer of solid particles other than starch may be formed, as will be explained hereinafter, and the apparatus is adapted for applying such a layer both to a cylindrical electrode 19 which is open at both ends, as is illustrated in Fig. 2, and to the cup-shaped electrode illustrated in Fig. 1. In the latter case the bottom insulating member 12 is preferably inserted before the separating layer is applied. Dry cell construction employing a cylindrical electrode open at both ends is described and claimed in Allison M. MacFarland copending application Serial No. 391,109, filed April 30, 1941.

Figures 3, 4:
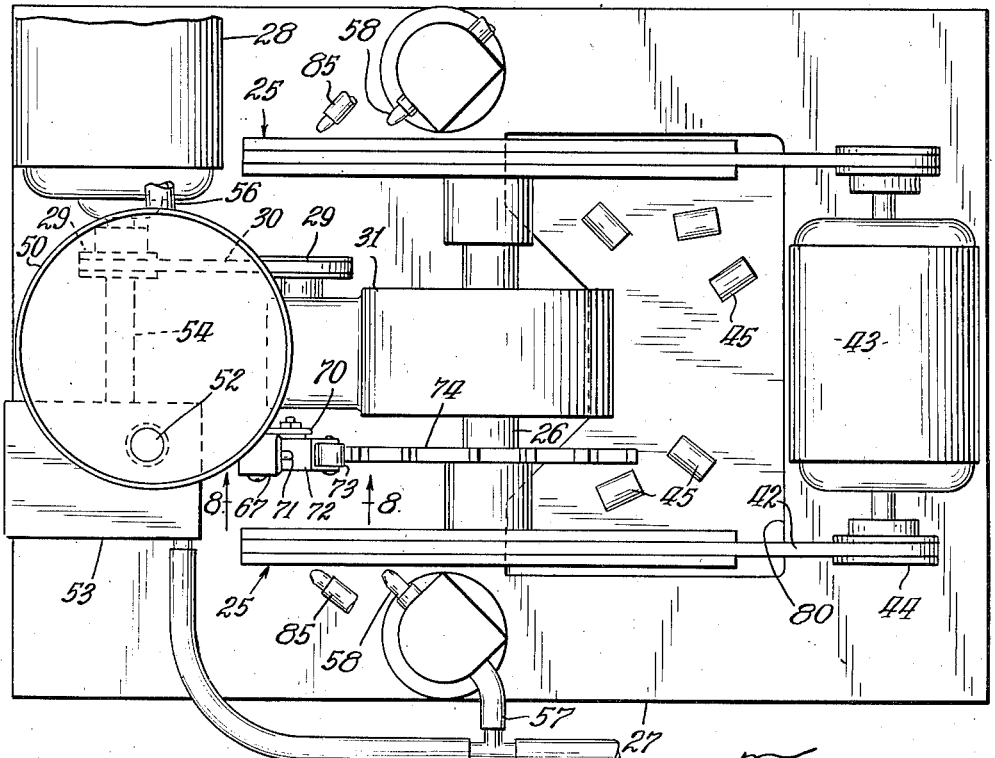
Fig. 3 is a plan view of the apparatus of this invention.
Figs. 4 and 5 are side and front elevational views, respectively, of the apparatus of Fig. 3.
Figure 5:
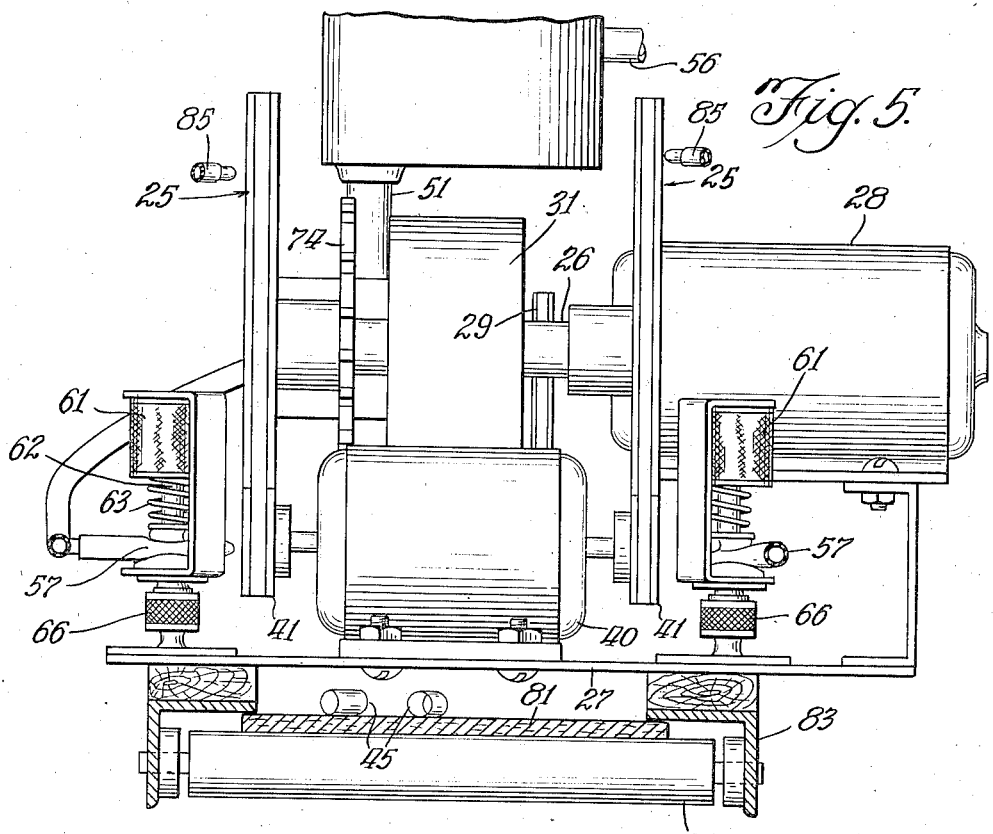

The apparatus shown in Figs. 3, 4 and 5 comprises two duplicate mechanisms for applying the layers of separating material to the cylindrical electrodes, both mechanisms being assembled into a single unitary machine, but being arranged so that each mechanism may be attended by a separate operator whereby the output is doubled. The description will be directed to but one of the mechanisms and in the drawings the same numerals will be applied to some of the more essential parts which are duplicated in the two mechanisms to indicate the dual character of the apparatus.

The apparatus consists of a circular frame 25 which is mounted for rotation about its axis upon an axle 26 which is mounted upon a suitable supporting base, which is indicated at 27. The frame is rotated by a motor 28, (see Fig. 3) which is also mounted upon base 27, the motion being transmitted by means of pulleys 29, belt 30 and reduction gear 31. The rate of rotation of the frame is relatively slow, for example, of the order of one revolution per minute.

The frame 25 carries a series of receptacles 32, which are arranged in mutually spaced relation adjacent the edge of the frame and in a circle about the axis of the frame. The receptacles are mounted for rotation about their axes and are adapted to receive the dry cell electrodes and impart their rotation to the electrodes.

Figure 6:
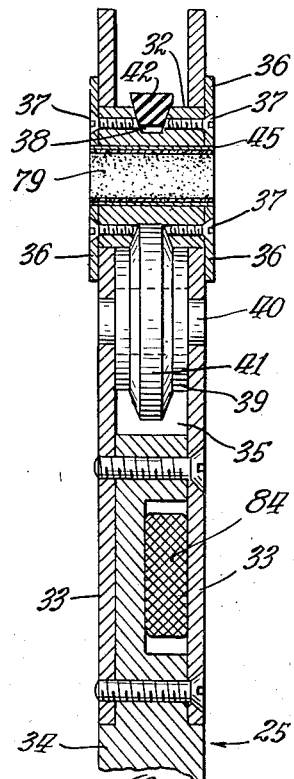
Fig. 6 is an enlarged fractional sectional view along line 6—6 of Fig. 4.

The structure of the receptacles and their mounting upon the frame are shown in detail in Fig. 6. The outer portion of the frame is hollow to receive the receptacle mechanism. To provide such hollow construction, two annular plate members 33 extend beyond the solid portion 34 of the frame, and are spaced apart to form a space 35 within which the mechanism may be accommodated. The two plates 33 carry aligned openings and the electrode receptacles 32 extend through the openings and across the space between the plates. Annular plates or washers 36 are attached to the edges of the receptacles 32 by means of bolts 37, and overlie the adjacent exterior surfaces of the frame members 33 and serve as guide flanges and protecting members, as will be explained hereinafter. The external portions of the receptacles have circumferential grooves 38 therein which are shaped to receive a V-belt 42. The grooves 38 are exposed in the space 35.

A plurality of rollers 39 are mounted for rotation about their axes upon frame 25. They are located in space 35 and arranged in mutually spaced relation in a circle about the axis of the frame. The rollers are supported by axles 40 which are mounted rotatably in openings in frame plates 33. The rollers have circumferential projections 41 which fit into the grooves 38 of the receptacles and make contact with the receptacles. As can be seen in Fig. 4, the circle of rollers 39 is located inwardly toward the axis of the frame with respect to the circle of receptacles 32, and each receptacle is located mid-way between and in contact with each pair of adjacent rollers. V-belt 42 passes around the circle of receptacles and engages those receptacles which are located in a predetermined portion of the circle, as shown in Fig. 4. The belt 42 is driven by a motor 43 which is mounted upon base 27, the power being transmitted to the belt by pulley 44. The receptacles fit relatively loosely in the openings in frame members 33, and belt 42, being under tension, causes the receptacles to press against the rollers.

In operation, the motor 28 causes the continuous rotation of the frame 25 at a slow rate of travel. The motor 43 operates at a relatively high velocity and causes the relatively rapid rotation of the receptacles upon their axes during that portion of their travel in revolving about the axis of the frame in which they are in contact with belt 42. The rate of rotation of the receptacles may be 2,000 revolutions per minute or more. There preferably is little pressure between the receptacles and the edges of the openings in plates 33, the inward pressure of the receptacles being borne mainly by rollers 39, whereby the rollers serve as bearing members for the rotation of the receptacles. In the same way, the flanges 36 assist but slightly in guiding the receptacles 32 against axial displacement, the guiding action being accomplished primarily by the projections 41 upon the rollers traveling in the grooves 38 of the receptacles. This type of construction has been found to be especially suitable for the purpose since it avoids the necessity for providing stationary cylindrical bearings within which the receptacles may turn. Any such bearing would have a relatively large surface in contact with the receptacle and the friction losses would be relatively great. Furthermore, bearings of that type would require cooperating stationary and moving bearing members located in the same circle with the receptacles, and this would increase considerably the effective space occupied by each receptacle, with the result that a larger apparatus would be required for the same number of receptacles. With the construction illustrated, the receptacles and the rollers are arranged in different circles and the maximum number of receptacles are accommodated in a given space. The bearing surfaces for the roller axles 40 are relatively small, with the result that friction losses are small and a minimum of energy is required for the rotation or spinning of the receptacles.

During the slow rotation of the frame, the operator inserts a cylindrical dry cell electrode 45 in a receptacle which is out of contact with belt 42 and is stationary with respect to its rotational motion. The direction of rotation of the frame 25 is indicated by the arrow in Fig. 4. The insertion may take place at any point after the receptacle has come to rest after leaving the influence of belt 42 and before it is again engaged by the belt. For convenience, the station 46 will be indicated as the station at which the electrode is inserted. If an electrode is in the receptacle from the previous cycle of rotation of the frame 25, such electrode will be discharged by the act of inserting the new electrode. The receptacles are constructed so as to make a sliding fit with the electrodes, the fit being such that the electrodes may be inserted readily while the rotational movement of the receptacles is, nevertheless, transmitted to the electrodes without any substantial slippage.

When the receptacle has advanced to the point where it is engaged by belt 42 it commences to rotate at high velocity. Subsequently, it reaches the station which is marked 47, and at this station a quantity of aqueous suspension of particles of ungelatinized starch is injected into the interior of the electrode. The suspension should not be viscous, but should be sufficiently fluid that it flows readily. A watery suspension is preferred. It may contain electrolyte salts in solution if desired, such as ammonium chloride and zinc chloride. The quantity of zinc chloride, however, should not be sufficient to cause any substantial gelatinization of the starch. If the electrode is in the shape of a cup, as illustrated in Fig. 1, the starch suspension need not be directed toward any particular point within the electrode, but if it is in the form of a cylinder open at both ends, as illustrated in Fig. 2, the suspension is directed against the interior cylindrical surface of the electrode in such manner that it is largely retained and not projected beyond the edges of the electrode.

Figure 7:
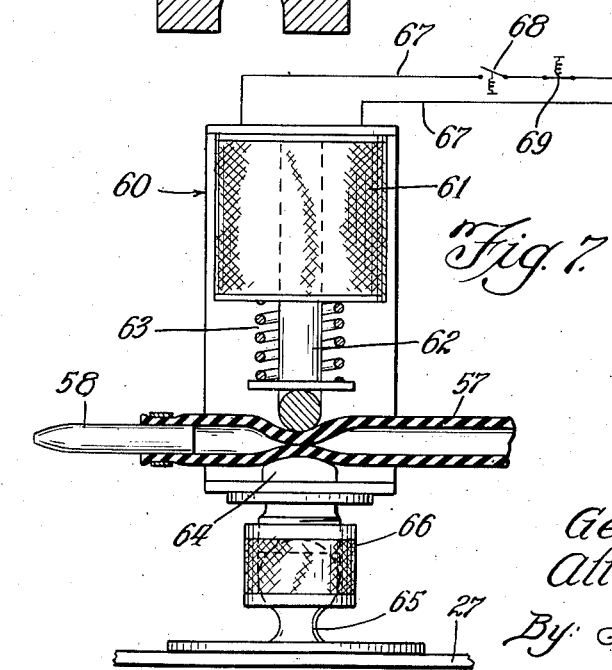
Fig. 7 is an enlarged view, partly in section, of a portion of a mechanism for controlling the supply of the separating material to the cylindrical metal electrodes.

The mechanism for supplying the starch suspension and momentarily injecting a quantity thereof into the electrodes comprises a supply tank 50 which has an open top into which the starch suspension may be introduced. A conduit 51 is connected with an opening 52 in the bottom of the supply tank and leads to a pump mechanism 53 which is driven by motor 28 through the medium of shaft 54. From the outlet of pump 53, a conduit 55 leads to one or more points of use and returns to the supply tank 50, connecting with the tank at a point 56 elevated above the bottom thereof. The conduit system and the pump supply the starch suspension under pressure to the point or points of use and keep the suspension in circulation, thereby agitating it and preventing settling of the starch particles. A short branch conduit 57 connects the supply conduit 55 with an injecting nozzle 58. The branch conduit 57, or a section thereof leading to nozzle 58, is of flexible material, such as rubber, and the mechanism 60 for controlling the injection of suspension into the electrodes consists of means for pinching the flexible conduit section 57 to close it against the flow of suspension, as shown in Fig. 7. A valve action is thereby provided, and for convenience the mechanism 60 will be called the valve-operating mechanism and the portion of flexible conduit 57 which opens and closes to control the flow of suspension will be called the valve. A valve of this type has been found to be advantageous for use with liquid suspensions, and especially an aqueous starch suspension, because it does not become stuck in one position with caked particles, as would be the case as with a conventional valve composed of parts which move relatively to each other.

The valve operating mechanism 60 (see Fig. 7) consists of an electromagnet 61, the armature 62 of which is normally operated by spring 63 to pinch the flexible conduit section 57 against an anvil member 64 and maintain the valve in the closed position. Upon energization of the electromagnet 61, the armature 62 is drawn upwardly to permit the valve to open and the suspension to be discharged from nozzle 58.

The valve operating member 60 is adjustably mounted upon a standard 65 carried by base 27. The standard is in two parts, the lower part having a spherical top portion and the upper part being the threaded bottom portion of anvil member 64, which is hollowed to fit the top of the spherical portion. A sleeve member 66 fits loosely over the spherical portion and is adapted to grip the under portion of the spherical surface thereof. The sleeve member makes threaded engagement with the upper part of the standard. When it is desired to adjust the direction of nozzle 58, sleeve member 66 is loosened by turning and the mechanism 60 is then moved to the desired position by rotating and tilting, after which sleeve member 66 is tightened again to fix the mechanism in the new position.

The means for controlling the discharge of suspension by the valve-operating mechanism 60 consists in a pair of electrical switches, one of which serves to energize electromagnet 61 and open the valve and the other of which serves to de-energize the electromagnet and close the valve, the two switches being synchronized with the rotational movement of the frame 25 to cause the momentary opening of the valve while the dry cell electrode is at station 47. While a single switch may be used to open and close the circuit which energizes electromagnet 61, the duration of the injecting operation is very short, usually only a fraction of a second, and it has been found that improved control is provided by two separate switches, one for closing and the other for opening the circuit. Furthermore, with different sizes of dry cell electrodes and other variations in conditions, it may be desirable to change the duration of the injecting operation, and the employment of two switches makes it possible to do this very readily by controlling the time of operation of one or the other of the switches.

The electrical circuit for electromagnet 61 is shown diagrammatically in Fig. 7 and consist of a pair of supply conductors 67 leading from the electromagnet 61 to a source of electrical energy which is not shown. The two switches 68 and 69 are connected in series with the supply conductors, switch 68 being normally in the open position and being closed by means which move with, or in synchronism with, frame 25, and switch 69 being a normally closed switch, which is adapted to be opened by means moving with, or in synchronism with, the frame 25.

Figure 8:
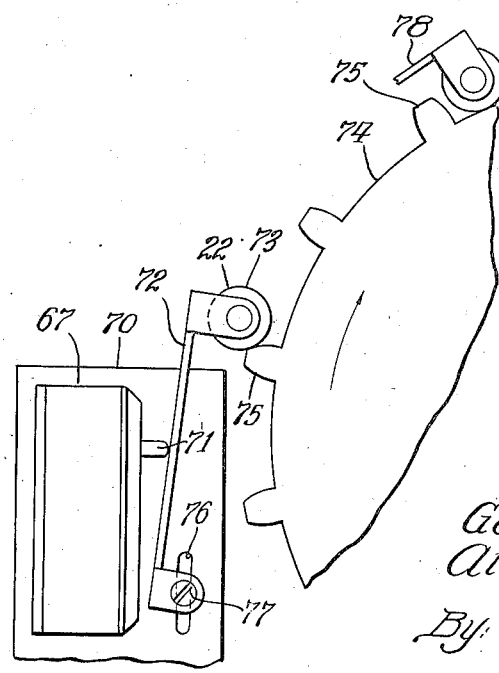
Fig. 8 is an enlarged fractional elevational view of a different portion of such control mechanism.

One of the switches, namely switch 68, and the means for operating it in synchronism with the movement of frame 25 are shown fragmentally in Fig. 8. While any suitable switch may be used, the one illustrated is of the type described in McGall United States Patent No. 1,960,020. The switch is mounted upon a supporting plate 70 and has an exposed operating plunger 71 which is normally in the extended position and may be moved to the depressed position to cause the closing of the switch. A switch operating arm 72 is mounted pivotally at one end upon supporting plate 70 and carries a roller 73 at the other end, which is adapted to roll upon cam wheel 74, which is mounted upon the axle 26 of frame 25, as shown in Fig. 3. Cam members 75 project outwardly from the circumference of cam wheel 74 and are arranged in mutually spaced relation corresponding to the spacing of electrode receptacles 32. There is a cam 75 for each receptacle 32, and the arrangement is such that as each electrode arrives at station 47 a cam lifts roller 73 and causes arm 72 to depress plunger 71 and close switch 68. The cam wheel 74 rotates in the direction of the arrow in Fig. 8, and in the position shown in this figure the switch operating arm 72 is in the act of operating the switch from the open to the closed position.

The time of operating the switch is preferably made adjustable to permit control of the time and duration of the injection operation. The means for adjusting the time of operation of the switch is as follows. The arm 72 is mounted upon supporting plate 70 by means of bolt 77 which passes through openings in the arm and in the supporting plate. The opening in the arm fits the bolt shank, but the opening in the supporting plate is in the form of an elongated slot 76, and the position of the arm may be adjusted upwardly or downwardly from the position shown in Fig. 9 in a manner obviously suitable for controlling the time of closing the switch.

Switch 69 (not illustrated, except diagrammatically in Fig. 7) which operates to open the circuit, is of a construction similar to switch 68 with the difference that operation of plunger 71 opens, instead of closes, the switch. Such modification is described in the said McGall Patent 1,960,020. The operation of switch 69 is similar to that of switch 68. It is located at a different position upon the circumference of cam wheel 74, as indicated by the fragment of the operating arm 78 therefor shown in Fig. 8, whereby a different cam 75 causes opening of the switch after the desired interval of time has elapsed from the closing of switch 68. Switch arm 78 preferably has an adjustable mounting similar to that of arm 72.

The operation of the control mechanism is as follows. The switches are normally in the positions shown in Fig. 7, in which positions the electromagnet 61 is deenergized and the injecting valve is closed. Upon arrival of a dry cell electrode at station 47, a cam 75 raises operating arm 72 of switch 68 to close the switch and energize electromagnet 61. The valve is thereby opened and the injection of starch suspension takes place. An instant later, and while arm 72 is still being carried by a cam 75, a different cam 75 raises the operating arm 78 of switch 69, as indicated in Fig. 8. Switch 69 is thereby opened and electromagnet 61 is de-energized and the valve is closed again to stop the injecting operation. Cams 75 are of the proper length so that before the next dry cell electrode has reached station 47, they permit the return of the switches to their normal positions whereby they are in readiness for effecting the next injection. The positions of the switch arms may be adjusted while the apparatus is operating to insure that the time and duration of the injecting operation is as desired.

An operator attends the side of the apparatus and inserts a dry cell electrode in each receptacle at the station indicated at 46 at which station the receptacle is at rest with respect to its spinning movement. Rotation of the frame 25 causes the receptacle to come into engagement with the belt 42 which causes the receptacle to rotate or spin at a high velocity, which rotation is imparted to the electrode. The receptacle and electrode subsequently reach station 47 where a quantity of aqueous starch suspension is injected into the electrode. The electrode is undergoing rapid spinning at the moment, and the starch suspension is instantly affected by centrifugal force whereby it is spread thinly and uniformly over the entire interior cylindrical surface of the electrode, and a small amount is projected beyond the open end of the electrode. The starch particles being heavier than the water or aqueous electrolyte solution in which it is suspended, a separation of the liquid and particles takes place. The particles are projected outwardly against the cylindrical surface of the electrode where they form a compact adherent layer, while the liquid forms a layer interiorly of the starch particles. As the spinning continues, the adherent layer of particles remains in place against the electrode surface while the liquid flows laterally and is expelled beyond the edge of the open end of the electrode. If the electrode is open at both ends, the liquid is expelled beyond both ends. In such operation, a large proportion of the liquid is expelled in a few moments, and the particles are left in the form of a moist immobile layer in adherent relation to the interior cylindrical surface of the electrode and uniform in thickness and in which the particles are compacted together into a firm, substantially solid mass. The layer is indicated at 79 in the open-ended electrode 19 illustrated in Fig. 2. The thickness of the layer is determined by several factors. It increases with the concentration of the suspension and the amount injected into each electrode, and decreases with increasing spinning speeds. These factors may all be adjusted to provide the desired results. Spinning speeds up to 15,000 revolutions per minute have been used successfully.

During the spinning operation, the frame 25 continues to rotate and the electrode moves with it and after the mechanical expulsion of liquid ceases, the drying of the layer continues by evaporation of moisture. The rate of travel of the frame is such that by the time the major portion of a revolution has been traversed and the receptacle containing the electrode leaves the influence of belt 42, the layer is substantially dry and is hard and tough and capable of withstanding the succeeding operations of inserting and compacting the depolarizing material and completing the assembly of the dry cell, whereby these operations may be proceeded with at once. A heating member 84 (see Fig. 6) may be incorporated in the apparatus for facilitating the drying of the moist layer. The member 84 is an electrical resistance member which is electrically energized and heats the marginal portion of frame 25, including plates 33. The heat is conductively carried to the receptacles 32 and the electrodes 45 therein, and the moisture is driven off from the moist layer at a relatively rapid rate. The heating may be regulated in such manner that the layer is not subjected to a temperature which will cause gelatinization of the starch. Gelatinization of the starch may be desirable, however, as it results in increased toughness of the layer, and the heating may be regulated so as to apply a gelatinizing temperature to the starch before all of the moisture has been driven off. The control may be such as to cause partial or complete gelatinization of the starch as desired. Regulation may be accomplished by inserting an adjustable rheostat (not shown) in the electrical supply circuit for the heating element.

As an alternative, the layer may be subjected to steam before all of the moisture has been driven off. The steam may be admitted by means of a nozzle 85, which is disposed, as shown in Fig. 4, to inject the steam into the electrode before the layer is completely dry. The steam temporarily arrests the drying action and causes gelatinization of the starch. The regulation of the steam supply is such as to cause the desired extent of gelatinization, whereby the final result is a hard and tough layer.

As a further alternative method of increasing the toughness of the layer, a small proportion of gelatinized starch may be included in the suspension of starch particles which is injected into the electrodes. The amount should not be sufficient to increase the viscosity of the suspension beyond that of an essentially watery suspension. Other suitable colloids, such as glue, may be used in place of the gelatinized starch.

During the spinning of the electrodes, the flanges 35 of the receptacles 32 serve to protect the mechanism from liquid being expelled by forming a protecting shield overlying the joint between the receptacle and the opening in frame 25 within which the receptacle is accommodated. Otherwise, there is a tendency for the liquid to penetrate into this opening, and if such penetration takes place, the operation of rollers 39 and of the belt 42 will not continue freely. The liquid contains a small amount of starch, and this starch would be deposited upon the moving parts and between these and the stationary parts and interfere with proper operation of the apparatus. While means may be provided to catch and recover the liquid expelled from the suspension, this is not necessary. The amount of liquid expelled is not of great volume and the major portion of it is deposited upon base 27 from which it may be cleaned periodically.

After leaving the influence of belt 42, the rotation of the receptacle and electrode ceases. If desired, braking means may be provided for stopping the receptacle. A new electrode is then inserted. The act of inserting the new electrode causes the simultaneous ejection of the coated electrode 45. It, therefore, marks the end of a complete cycle of operations and the beginning of a new cycle.

The coated electrode 45 falls through an opening 80 in the base 27 (see Fig. 3) and upon belt conveyor 81, which is carried by rollers 82. The rollers are supported upon bracket member 83 which depends from base 27. The coated electrodes are carried by conveyor 81 to a point where an operator makes the desired disposition of them for the ensuing operations.

The apparatus has been described in connection with the application of a layer of starch to the interior surface of the dry cell electrodes, but it is not limited to the application of such material and may be employed for applying any other desired material, in the form of solid particles. For example, other cereals, clays, powdered silica, and other materials may be used. For successful operation, the solid particles should have a specific gravity greater than that of the liquid so that the separating action between the solids and the liquid takes place as described heretofore and the solids form a layer upon the electrode surface. While water or an aqueous solution of electrolyte salts is the preferred liquid for the suspension, other liquids may be used which are suitable and do not have any deleterious effect upon the operation of the dry cells.

The description has been devoted to an apparatus consisting of a single rotary frame and injecting mechanism, but for economical purposes a second frame 25 is mounted upon the opposite end of axle 26 and a second injecting mechanism including an injecting nozzle 58 is employed in co-operative relation to the second frame. The dual character of the apparatus is shown in Figs. 3 and 5.

Figure 9:
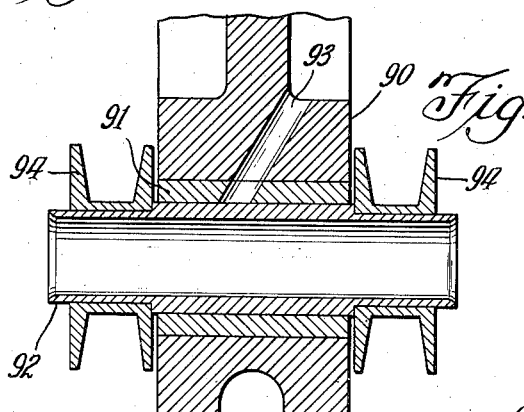
Fig. 9 is a sectional view of an alternative form of a part of the apparatus, e. g., means for imparting rotation or spinning motion to the cylindrical electrodes.

The electrode receptacle may take a modified form, as is illustrated in Fig. 9. This type of receptacle is adapted for use with cylindrical electrodes of increased length and relatively small diameter. The circular frame 90, which is employed in place of the frame 25 which has been described, has openings extending through it from side to side at spaced intervals adjacent its circumference. The opening is lined with a cylindrical bearing member 91, which may be of a so-called oil-less bearing composition in which a solid lubricant, such as graphite, is disseminated throughout the material of which the bearing member is composed. The electrode receptacle 92 is mounted within the bearing member 91 and adapted to rotate therein. A conduit 93 may be provided if desired leading from the surface of the frame 90 to the surface of receptacle 92, into which conduit suitable lubricant, such as oil or grease, may be introduced for assisting in the lubrication of the bearing surfaces between receptacle 92 and bearing member 91. A pulley 94 is fitted upon each end of the receptacle 92 and overlies the adjacent surface of bearing member 91 and frame 90 and serves as a flange for maintaining receptacle 92 in position during its rotational movement and as a guard against liquid which is being expelled from the electrodes. Pulleys 94 are adapted for receiving V-belts which may be arranged and driven in the same manner as belt 42. The operation of apparatus having receptacles of this form is the same as that which has been described heretofore.

As an alternative to the use of the heating element 84, a current of heated air may be blown into the coated electrodes during all or a part of the time they are traveling from station 47 to station 46.

While the apparatus is described and shown as maintaining the electrodes in the horizontal position during the operations, it is adapted as well for maintaining them in other positions, for example, the vertical. It may be arranged in such manner that frame 25 rotates about a vertical axis. Such arrangement is especially suitable for cup-shaped electrodes which are closed at one end, as is shown in Fig. 1.

We claim:

1. Apparatus for forming an adherent, substantially solid layer upon the interior cylindrical surface of a dry cell electrode out of an aqueous suspension of solid particles, which comprises a frame rotatable about an axis thereof, means for rotating said frame, a plurality of cylindrical receptacles for said electrodes mounted for rotation about their axes on said frame, said receptacles being adapted to accommodate and impart rotational motion to said electrodes and being arranged in mutually spaced relation in a circle about the axis of said frame, means for injecting a quantity of said suspension into each of said cylindrical electrodes and against the interior cylindrical surface thereof at a predetermined station in the rotational travel of said frame, said injecting means comprising a nozzle arranged to direct said suspension into said electrode at said station, a supply container for said suspension and a conduit system connecting said container to said nozzle, means for maintaining said suspension under pressure in said conduit system, a section of said conduit system leading to said nozzle having flexible walls, spring operated means for pinching said flexible conduit section and closing it against the flow of suspension therein, electrically operated means for momentarily retracting said spring and opening said pinching means, means for synchronizing the operation of said spring retracting means with the rotational movement of said frame to cause said operation to occur when an electrode is at said station, means for rotating said receptacles during predetermined rotational travel of said frame immediately following said injection of suspension.

2. Apparatus for forming an adherent, substantially solid layer upon the interior cylindrical surface of a dry cell electrode out of an aqueous suspension of solid particles, which comprises a frame rotatable about an axis thereof, means for rotating said frame, a plurality of cylindrical receptacles for said electrodes mounted for rotation about their axes on said frame, said receptacles being adapted to accommodate and impart rotational motion to said dry cell electrodes and being arranged in mutually spaced relation, means for injecting a quantity of said suspension into each of said cylindrical electrodes and against the interior cylindrical surface thereof at a predetermined station in the rotational travel of said frame, said injecting means comprising a nozzle arranged to direct said suspension into said electrode at said station, a supply container for said suspension and a conduit system connecting said container to said nozzle, means for maintaining said suspension under pressure in said conduit system, a section of said conduit system leading to said nozzle having flexible walls, means for pinching said flexible conduit section and closing it against the flow of suspension therein, means for momentarily opening said pinching means when each receptacle is at said station, means for rotating said receptacles during predetermined rotational travel of said frame immediately following said injection of suspension.

3. Apparatus for forming an adherent, substantially solid layer upon the interior cylindrical surface of a dry cell electrode out of a liquid suspension of solid particles, which comprises a frame rotatable about an axis thereof, means for rotating said frame, a plurality of cylindrical receptacles for said electrodes mounted for rotation about their axes on said frame, said receptacles being adapted to accommodate and impart rotational motion to said dry cell electrodes and being arranged in mutually spaced relation, means for injecting a quantity of said suspension into each of said cylindrical electrodes and against the interior cylindrical surface thereof at a predetermined station in the rotational travel of said frame, said injecting means comprising a nozzle arranged to direct said suspension into said electrode at said station, means for adjusting the position of said nozzle, a supply container for said suspension and a conduit system connecting said container to said nozzle, means for maintaining said suspension under pressure in said conduit system, means for ejecting a quantity of said suspension from said nozzle when a receptacle is at said station, means for rotating said receptacles during predetermined rotational travel of said frame immediately following said injection of said suspension.

4. Apparatus for forming an adherent, substantially solid layer upon the interior cylindrical surface of a dry cell electrode out of a liquid suspension of solid particles, which comprises a frame rotatable about an axis thereof, means for rotating said frame, a plurality of cylindrical receptacles for said electrodes mounted for rotation about their axes on said frame, said receptacles being adapted to accommodate and impart rotational motion to said dry cell electrodes and being arranged in mutually spaced relation, a supply container and closed conduit system connected thereto for containing a supply of said suspension, means for continuously circulating said suspension in said container and conduit system, means for discharging suspension from said conduit sytem into an electrode at a predetermined station in the rotational travel of said frame, means for rotating said receptacles during predetermined rotational travel of said frame immediately following said injection of suspension into said electrodes.

5. Apparatus for forming an adherent, substantially solid layer upon the interior cylindrical surface of a dry cell electrode from a liquid suspension of solid particles, comprising a frame rotatable about an axis thereof, means for rotating said frame, a plurality of cylindrical receptacles for said electrodes mounted for rotation about their axes on said frame, said receptacles being adapted to accommodate and impart rotation to said dry cell electrodes and being arranged in mutually spaced relation, a conduit system for containing a supply of said suspension, means for discharging a quantity of said suspension from said conduit system against the interior cylindrical surfaces of said electrodes at a predetermined station in the rotational travel of said frame, means for rotating said receptacles during a predetermined fractional part only of the rotational travel of said frame immediately following said injection of suspension into said electrodes.

6. Apparatus for forming an adherent, substantially solid layer of starch upon the interior cylindrical surface of a dry cell electrode from an aqueous suspension of starch particles, which comprises a frame rotatable about an axis thereof, means for rotating said frame, a plurality of receptacles for said electrodes mounted on said frame, said receptacles being rotatable and adapted to accommodate and impart rotation to said dry cell electrodes, a conduit for supplying said suspension, means for discharging a quantity of said suspension from said conduit into an electrode at a predetermined station in the rotational travel of said frame, means for rotating said receptacles during predetermined rotational travel of said frame immediately following said injection of starch suspension, and means for heating said starch to impart gelatinization thereto during said rotation of said frame.

7. Apparatus for forming an adherent, substantially solid layer of starch upon the interior cylindrical surface of a dry cell electrode from an aqueous suspension of starch particles, which comprises a frame rotatable about an axis thereof, means for rotating said frame, a plurality of receptacles for said electrodes mounted on said frame, said receptacles being rotatable and adapted to accommodate and impart rotation to said dry cell electrodes, a conduit for supplying said suspension, means for discharging a quantity of said suspension from said conduit into an electrode at a predetermined station in the rotational travel of said frame, means for rotating said receptacles during predetermined rotational travel of said frame immediately following said injection of starch suspension, and means for admitting steam to the starch coated electrodes during a portion of said rotational travel of said frame.

8. Apparatus for forming an adherent, substantially solid layer upon the interior cylindrical surface of a dry cell electrode out of a liquid suspension of solid particles, which comprises a frame rotatable about an axis thereof, means for rotating said frame at a relatively slow rate of rotation, a plurality of rollers and of cylindrical receptacles for said electrodes mounted for rotation about their axes on said frame, said receptacles being adapted to accommodate and impart rotation to said dry cell electrodes, said rollers and said receptacles respectively being arranged in mutually spaced relation in separate circles about said frame axis, said receptacles being arranged exteriorly of said rollers and engaging said rollers as bearing members for their rotational movement, means for injecting a quantity of said suspension against the interior cylindrical surface of each of said electrodes at a predetermined station in the rotational travel of said frame, said receptacles each having an exterior circumferential groove therein shaped to receive a V-belt, said rollers being shaped to fit into said grooves and guide said receptacles against axial displacement, an endless V-belt passing around said circle of receptacles and engaging the receptacles in a predetermined portion of said circle immediately following said starch injecting station in the direction of travel of said frame, and means for driving said V-belt to rotate said receptacles at a relatively high velocity.

9. Apparatus for forming an adherent, substantially solid layer upon the interior cylindrical surface of a dry cell electrode out of a liquid suspension of solid particles, which comprises a frame rotatable about an axis thereof, means for rotating said frame, a plurality of rollers and cylindrical receptacles mounted for rotation about their axes on said frame, said receptacles being adapted to accommodate and impart rotation to said electrodes, said rollers and said receptacles respectively being arranged in mutually spaced relation, said receptacles being arranged at a lesser distance from the edge of said frame than said rollers and engaging said rollers as bearing members for their rotational movement, an endless belt passing around said group of receptacles and engaging the receptacles between predetermined stations in the rotation of said frame, and means for injecting a quantity of said suspension into each of said cylindrical electrodes at a station at which said belt is in contact with the receptacle carrying said electrode.

10. Apparatus for applying a uniform, adherent, substantially solid layer to the interior cylindrical surface of a cylindrical dry cell electrode, comprising a frame rotatable about an axis thereof, means for rotating said frame at a relatively slow rate of rotation, a plurality of cylindrical receptacles mounted for rotation about their axes on said frame, said receptacles being arranged in mutually spaced relation and being adapted to accommodate and impart rotation to said dry cell electrodes, means for injecting a quantity of aqueous suspension of solid particles into each of said cylindrical electrodes and against the interior cylindrical surface thereof at a predetermined station in the rotational travel of said frame, means for rotating said receptacles at a relatively fast rate of rotation during a predetermined fractional part only of the rotational travel of said frame immediately following said injection of suspension.

11. Apparatus for forming an adherent, substantially solid layer upon the interior cylindrical surface of an open-ended hollow cylindrical body out of a liquid suspension of solid particles, which comprises a movable carrier member for said cylindrical bodies, means for advancing said carrier member, a plurality of receptacles carried by said carrier member, said receptacles being arranged in mutually spaced relation and being adapted to accommodate said cylindrical bodies and support said bodies for rotation about the axes of said bodies, means for injecting a quantity of said suspension into each of said cylindrical bodies at a predetermined station in the advance travel of said carrier member, and means for rotating said cylindrical bodies at high velocity during a predetermined fractional part only of the advance travel of said carrier member immediately following said injection of suspension.

12. Apparatus for forming an adherent, substantially solid layer upon the interior cylindrical surface of an open-ended hollow cylindrical body out of a liquid suspension of solid particles, which comprises a movable carrier member for said cylindrical bodies, means for advancing said carrier member, a plurality of rollers mounted for rotation on said carrier member, said rollers being arranged to provide support for a plurality of said hollow cylindrical bodies at mutually spaced intervals along said carrier member, means for injecting a quantity of said suspension into each of said cylindrical bodies at a predetermined station in the advance travel of said carrier member, and means for rotating said cylindrical bodies during predetermined advance travel of said carrier member immediately following said injection of suspension.

13. Apparatus for forming an adherent, substantially solid layer upon the interior cylindrical surface of a dry cell electrode out of a liquid suspension of solid particles, which comprises a frame rotatable about an axis thereof, means for rotating said frame, a plurality of receptacles for said electrodes mounted for rotation about their axes on said frame, said receptacles being arranged in mutually spaced relation and being adapted to accommodate and impart rotation to said dry cell electrodes, means for rotating said receptacles during a predetermined fractional part only of the rotational travel of said frame and means for injecting a quantity of said suspension into each of said cylindrical electrodes during rotation of said frame within said predetermined fractional part of the rotational travel of said frame.

14. Apparatus for forming an adherent, substantialy solid layer upon the interior cylindrical surface of a dry cell electrode out of a liquid suspension of solid particles, which comprises a frame rotatable about an axis thereof, means for rotating said frame, a plurality of receptacles for said electrodes mounted for rotation about their axes on said frame, said receptacles being arranged in mutually spaced relation and being adapted to accommodate and impart rotation to said dry cell electrodes, means for rotating said receptacles during predetermined rotational travel of said frame, means for injecting a quantity of said suspension into each of said cylindrical electrodes during said predetermined rotational travel of said frame, and means for heating said suspension in said electrodes during said predetermined rotational travel of said frame.

15. Apparatus for forming an adherent, substantially solid layer upon the interior cylindrical surface of a dry cell electrode out of a liquid suspension of solid particles, which comprises a frame rotatable about an axis thereof, means for rotating said frame, a plurality of receptacles for said electodes mounted for rotation about their axes on said frame, said receptacles being arranged in mutually spaced relation and being adapted to accommodate and impart rotation to said dry cell electrodes, means for rotating said receptacles during predetermined rotational travel of said frame, means for injecting a quantity of said suspension into each of said cylindrical electrodes during said predetermined rotational travel of said frame, means for adjusting the time and duration of said injecting operation, and means for heating said suspension in said electrodes during said predetermined rotational travel of said fame.

16. Apparatus for forming an adherent, substantially solid layer upon the interior cylindrical surface of a dry cell electrode out of a liquid suspension of solid particles, which carries a frame rotatable about an axis thereof, means for rotating said frame, a plurality of receptacles for said electrodes mounted for rotation about their axes on said frame, said receptacles having flanges overlying the adjacent portions of the exterior surfaces of said frame, said receptacles being arranged in mutually spaced relation and being adapted to accommodate and impart rotation to said dry cell electrodes, means for rotating said receptacles during predetermined rotational travel of said frame, means for injecting a quantity of said suspension into each of said cylindrical electrodes during said predetermined rotational travel of said frame and means for heating said suspension in said electrodes during said predetermined rotational travel of said frame.

17. Apparatus for forming an adherent, substantialy solid layer upon the interior cylindrical surface of an open-ended hollow cylindrical body out of a liquid suspension of solid particles, which comprises a plurality of rotatable receptacles each adapted to support one of said cylindrical bodies and impart rotation thereto, means for advancing said receptacles in succession past a predetermined station, means for injecting a quantity of said suspension into each of said cylindrical bodies at said station, and means for rotating said receptacles for a predetermined time immediately following said injection of suspension and thereafter permitting said receptacles to come to rest with respect to the rotational motion thereof.

GEORGE H. NELSON.
ALLISON M. MacFARLAND.

CERTIFICATE OF CORRECTION.

Patent No. 2,355,232.

August 8, 1944.

GEORGE H. NELSON, ET AL.

It is hereby certified that error appears in the printed specification of the above numbered patent requiring correction as follows: Page 8, first column, line 12-13, claim 16, for the word "carries" read --comprises--; and second column, line 6-7, claim 17, for "substantialy" read --substantially--; and that the said Letters Patent should be read with this correction therein that the same may conform to the record of the case in the Patent Office.

Signed and sealed this 17th day of October, A. D. 1944.

Leslie Frazer (Seal)

Acting Commissioner of Patents.